(12) United States Patent
Toyohira et al.

(10) Patent No.: US 11,613,152 B2
(45) Date of Patent: Mar. 28, 2023

(54) ELECTRIC SUSPENSION APPARATUS

(71) Applicant: HONDA MOTOR CO., LTD., Tokyo (JP)

(72) Inventors: Tomoya Toyohira, Tokyo (JP); Takafumi Kato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/674,982

(22) Filed: Feb. 18, 2022

(65) Prior Publication Data

US 2022/0305870 A1     Sep. 29, 2022

(30) Foreign Application Priority Data

Mar. 25, 2021  (JP) ............................. JP2021-051517

(51) Int. Cl.
B60G 17/019      (2006.01)

(52) U.S. Cl.
CPC .... B60G 17/01908 (2013.01); *B60G 2202/42* (2013.01); *B60G 2400/106* (2013.01)

(58) Field of Classification Search
CPC .......... B60G 17/01908; B60G 2202/42; B60G 2400/106
See application file for complete search history.

(56) References Cited

U.S. PATENT DOCUMENTS

| | | | | |
|---|---|---|---|---|
| 4,856,798 A * | 8/1989 | Buma | .................. | B60G 17/016 180/41 |
| 6,098,994 A * | 8/2000 | Kunishima | .......... | B60G 17/016 280/5.514 |
| 8,296,009 B2 * | 10/2012 | Kajino | ............... | B60G 17/0165 701/37 |
| 2004/0030473 A1 * | 2/2004 | Lu | ....................... | B60R 16/0233 701/36 |
| 2006/0142916 A1 * | 6/2006 | Onuma | ................ | B60G 21/067 280/5.506 |
| 2006/0186728 A1 * | 8/2006 | Mizuta | ............... | B60G 17/0152 303/3 |
| 2010/0025946 A1 * | 2/2010 | Inoue | ..................... | B60G 15/08 280/6.157 |
| 2010/0230876 A1 * | 9/2010 | Inoue | ..................... | B60G 13/14 267/140.14 |
| 2016/0107498 A1 * | 4/2016 | Yamazaki | .......... | B60G 17/0162 701/37 |
| 2019/0351726 A1 * | 11/2019 | Okimura | ............ | B60G 17/0165 |
| 2022/0305863 A1 * | 9/2022 | Konada | ............. | B60G 17/0157 |
| 2022/0305866 A1 * | 9/2022 | Konada | ............. | B60W 30/085 |
| 2022/0306138 A1 * | 9/2022 | Ohno | .................. | B60W 40/105 |

FOREIGN PATENT DOCUMENTS

JP        2012-131395       7/2012

* cited by examiner

*Primary Examiner* — Toan C To
(74) *Attorney, Agent, or Firm* — Rankin, Hill & Clark LLP

(57) ABSTRACT

An electric suspension apparatus includes electric actuators provided for a plurality of wheels, respectively, an acceleration sensor disposed in each of the electric actuators, the acceleration sensor detecting a first acceleration, and an electric suspension control ECU controlling each of the electric actuators based on the first acceleration, and the electric suspension control ECU decreases a control amount to the electric actuator, in a case where a first speed based on the first acceleration in an up-down direction is equal to or less than a predetermined speed.

4 Claims, 3 Drawing Sheets

ELECTRIC SUSPENSION APPARATUS

INCORPORATION BY REFERENCE

The present application claims priority under 35 U.S.C. § 119 to Japanese Patent Application No. 2021-051517 filed on Mar. 25, 2021. The content of the application is incorporated herein by reference in its entirety.

BACKGROUND OF THE INVENTION

Field of the Invention

The present invention relates to an electric suspension apparatus.

Description of the Related Art

Heretofore, a technology concerning an electric suspension apparatus mounted in a vehicle and driven with a motor has been known.

For example, Japanese Patent Laid-Open No. 2012-131395 describes an electric suspension apparatus in which an electric actuator is provided for each of a plurality of wheels, and the electric actuator is controlled based on a detection result of an acceleration sensor, so that vibration applied to the plurality of wheels can be inhibited from being transmitted to a vehicle body.

In an electric suspension apparatus described in Japanese Patent Laid-Open No. 2012-131395, however, an electric actuator is controlled based on a detection result of an acceleration sensor, and hence the electric actuator might be controlled to suppress an acceleration which does not influence riding comfort. As a result, power might be wasted.

The present invention is intended to reduce power consumption of an electric suspension apparatus.

SUMMARY OF THE INVENTION

An aspect of the present invention is an electric suspension apparatus including electric actuators provided for a plurality of wheels, respectively, an acceleration sensor disposed in each of the electric actuators, the acceleration sensor detecting an acceleration in an up-down direction, and a control device controlling each of the electric actuators based on the acceleration in the up-down direction, wherein the control device decreases a control amount to the electric actuator, in a case where a speed in an up-down direction based on the acceleration in the up-down direction is equal to or less than a predetermined speed.

According to another aspect of the present invention, in the above electric suspension apparatus, the control device decreases the control amount to the electric actuator, in a case where a direction of an acceleration of a front wheel and a direction of an acceleration of a rear wheel are the same direction.

According to still another aspect of the present invention, in the above electric suspension apparatus, the control device increases the control amount to the electric actuator, in a case where a direction of an acceleration of a front wheel and a direction of an acceleration of a rear wheel are opposite directions.

According to a further aspect of the present invention, in the above electric suspension apparatus, the control device corrects the acceleration of each of front left and right wheels, by subtracting an average value of accelerations of rear left and right wheels from the acceleration of each of the front left and right wheels, corrects the acceleration of each of the rear left and right wheels, by subtracting an average value of accelerations of the front left and right wheels from the acceleration of each of the rear left and right wheels, and controls the electric actuator based on a corrected acceleration of each wheel.

According to aspects of the present invention, power consumption of an electric suspension apparatus can be reduced.

DETAILED DESCRIPTION OF THE PREFERRED EMBODIMENT

Hereinafter, an embodiment of the present invention will be described with reference to the drawings.

1. Configuration of Electric Suspension Apparatus

Figure 1:
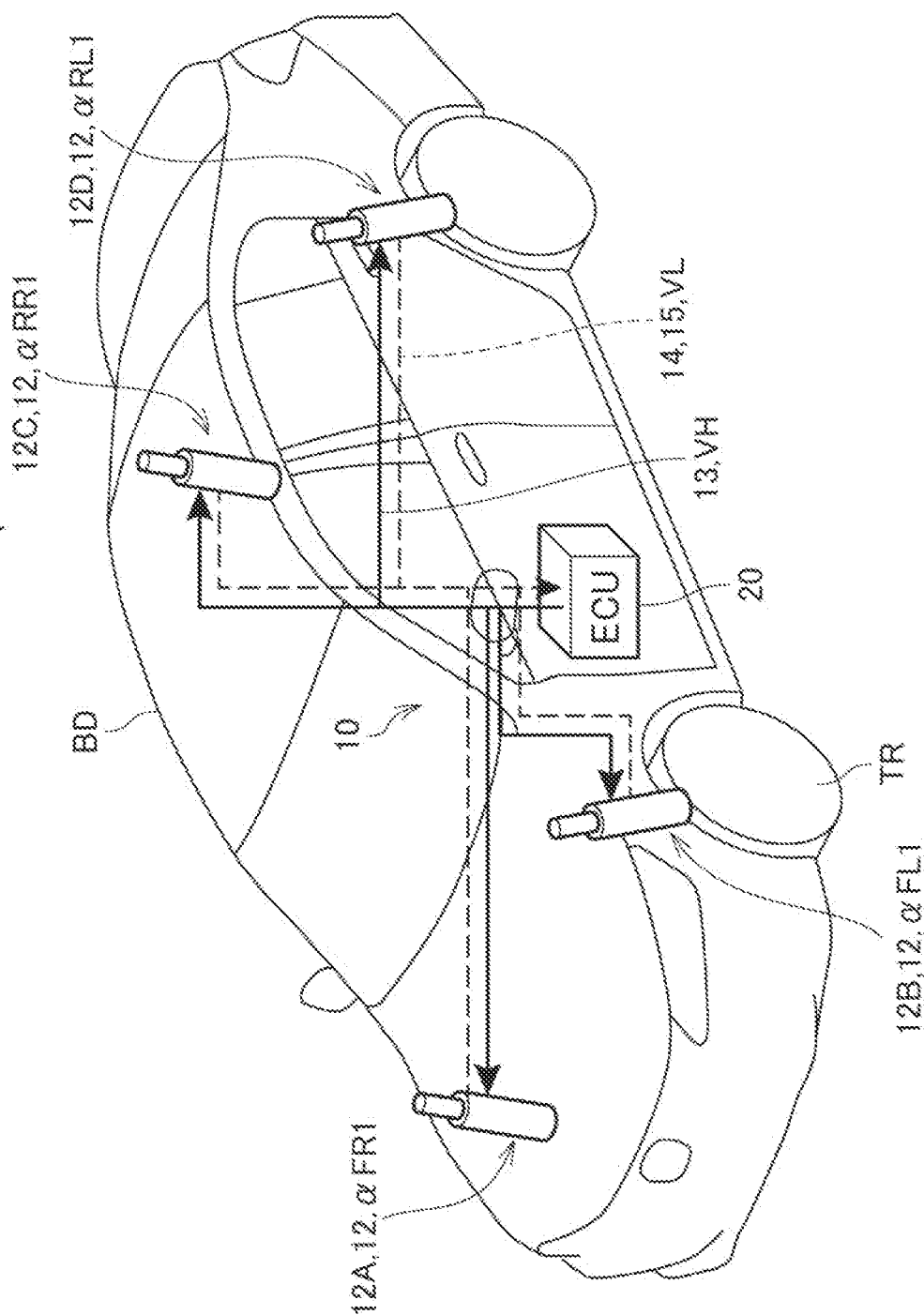
FIG. 1 is a perspective view showing an example of arrangement of an electric suspension apparatus.
Figure 2:
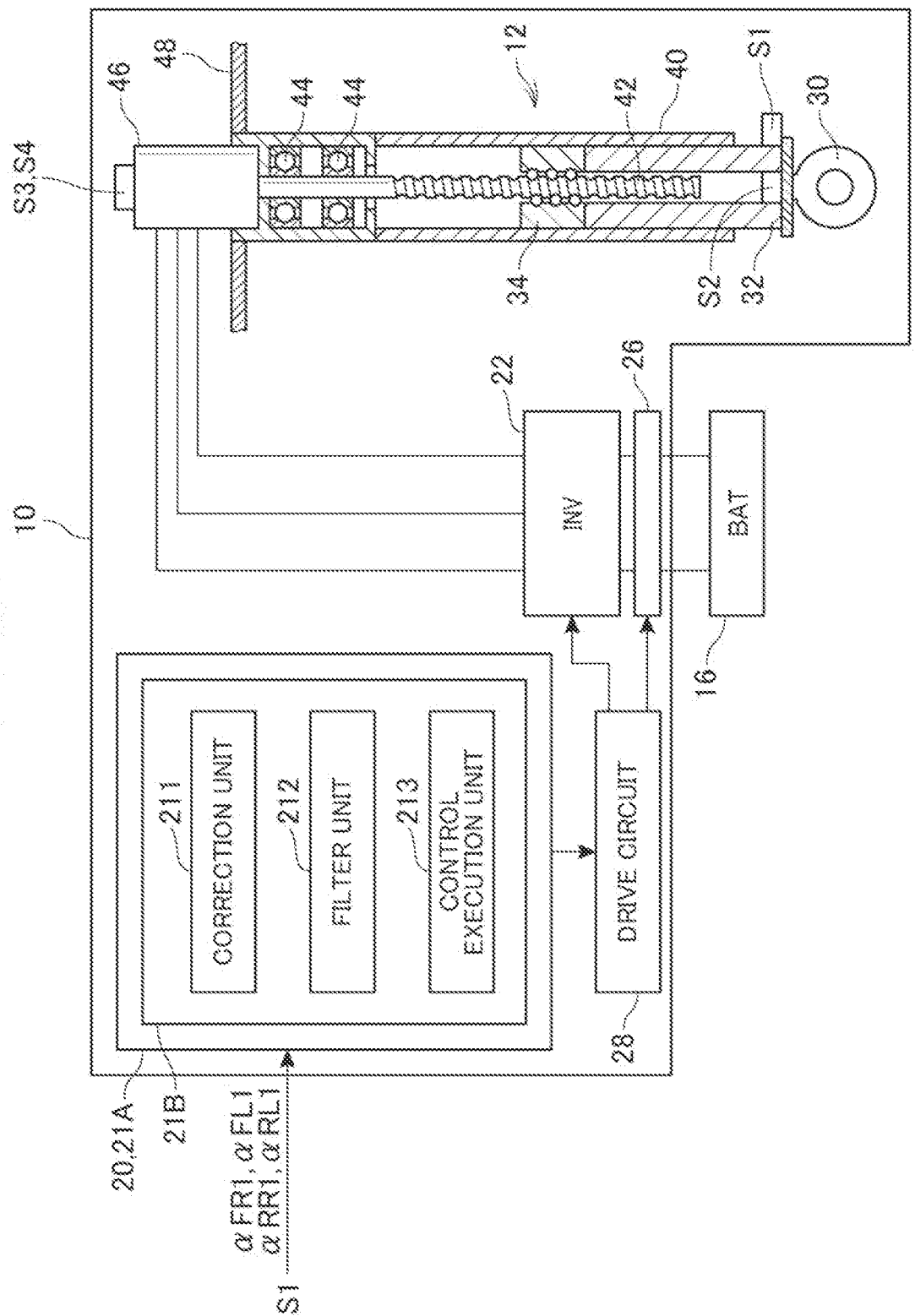
FIG. 2 is a diagram showing an example of a configuration of the electric suspension apparatus.

FIG. 1 is a perspective view showing an example of arrangement of an electric suspension apparatus 10. FIG. 2 is a diagram showing an example of a configuration of the electric suspension apparatus 10.

Description will be made as to the electric suspension apparatus 10 with reference to FIGS. 1 and 2.

As shown in FIG. 1, a vehicle 1 includes a vehicle body BD, four wheels TRs, and the electric suspension apparatus 10. The electric suspension apparatus 10 includes an electric actuator 12, and an electric suspension control ECU 20.

The electric actuator 12 is disposed outside the vehicle body BD. Specifically, the electric actuator 12 includes a first electric actuator 12A, a second electric actuator 12B, a third electric actuator 12C, and a fourth electric actuator 12D. The first electric actuator 12A is disposed between the vehicle body BD and a right front wheel. The second electric actuator 12B is disposed between the vehicle body BD and a left front wheel. The third electric actuator 12C is disposed between the vehicle body BD and a right rear wheel. The fourth electric actuator 12D is disposed between the vehicle body BD and a left rear wheel.

The electric suspension control electronic control unit (ECU) 20 controls each of the first electric actuator 12A to the fourth electric actuator 12D. The electric suspension control ECU 20 is connected to each of the first electric actuator 12A to the fourth electric actuator 12D via a high voltage line 13, a signal line 14, and a low voltage line 15.

The high voltage line 13 supplies power of a high voltage VH from a battery 16 shown in FIG. 2 to each of the first electric actuator 12A to the fourth electric actuator 12D. The power of the high voltage VH is for use in driving a motor 46 shown in FIG. 2. The high voltage VH is, for example, in a range of from AC 33 V to 37 V.

The signal line 14 transmits detection signals of a sensor S1 to a sensor S4 shown in FIG. 2 to the electric suspension control ECU 20.

Description will be made as to the sensor S1 to the sensor S4 with reference to FIG. 2.

The low voltage line 15 supplies power of a low voltage VL from the battery 16 shown in FIG. 2 to each of the first electric actuator 12A to the fourth electric actuator 12D. The power of the low voltage VL is for use in actuating the sensor S1 to the sensor S4 shown in FIG. 2. The low voltage VL is, for example, DC 5 V.

In the following description, the electric suspension control ECU 20 may be described as the control ECU 20 for convenience.

The first electric actuator 12A to the fourth electric actuator 12D include about the same configuration, and hence in a case where each of the first electric actuator 12A to the fourth electric actuator 12D is not distinguished, each of the first electric actuator 12A to the fourth electric actuator 12D may be described below simply as the electric actuator 12.

Next, description will be made as to a configuration of the electric actuator 12 with reference to FIG. 2.

As shown in FIG. 2, the electric actuator 12 includes a coupling part 30, an inner tube 32 and a nut 34 as members on a wheel TR side. Also, the electric actuator 12 includes an outer tube 40, a screw shaft 42, a bearing 44, and the motor 46 as members on a vehicle body BD side. The outer tube 40, the bearing 44 and the motor 46 are fixed to a chassis 48 disposed in a lower part of the vehicle body BD.

The screw shaft 42 is supported by the bearing 44 and the nut 34. The nut 34 has an inner surface screwed into a screw groove formed in an outer surface of the screw shaft 42 via a bearing.

When the motor 46 rotates the screw shaft 42, the nut 34 is moved in an up-down direction. When moving the nut 34 downward, the inner tube 32 is moved downward. When moving the nut 34 upward, the inner tube 32 is moved upward.

Consequently, a position of the inner tube 32 in the up-down direction to the outer tube 40 fixed to the chassis 48 of the vehicle body BD can be adjusted.

The coupling part 30 is fixed to a knuckle (not shown) of the suspension apparatus, and is accordingly coupled to the wheel TR. When inputting vibration from the wheel TR side into the coupling part 30 and applying, for example, an upward acceleration to the coupling part 30, the inner tube 32 and the nut 34 are raised integrally with the outer tube 40. In this case, the motor 46 rotates the screw shaft 42 to move the inner tube 32 in a direction to absorb the upward acceleration, i.e., in an upward direction, so that vibration from the wheel TR to the vehicle body BD can be damped.

In the electric actuator 12, an acceleration sensor S1, a stroke sensor S2, a rotation angle sensor S3 and a voltage sensor S4 are arranged.

The acceleration sensor S1 is fixed, for example, to an outer circumferential surface of the inner tube 32, to detect a first acceleration $\alpha 1$ applied from the wheel TR side to the coupling part 30. In the present embodiment, description is made as to a case where the acceleration sensor S1 detects the first acceleration $\alpha 1$ in the up-down direction on a spring of the vehicle body BD.

The first acceleration $\alpha 1$ corresponds to an example of "an acceleration in an up-down direction".

The stroke sensor S2 is disposed at a position facing the screw shaft 42 of the inner tube 32, to detect a stroke ST indicating a downward moving amount of the nut 34. The stroke sensor S2 is composed of a distance measurement sensor or the like.

The rotation angle sensor S3 is composed of a so-called resolver, Hall element or the like, to detect a rotation angle $\theta$ of the motor 46.

The voltage sensor S4 detects a voltage V applied to the motor 46. In a state where the motor 46 is driven with the power from the battery 16, the voltage V indicates the high voltage VH supplied from the battery 16 through the high voltage line 13.

The first acceleration $\alpha 1$, the stroke ST, the rotation angle $\theta$ and the voltage V are outputted to the control ECU 20.

As shown in FIG. 1, the acceleration sensor S1 disposed in the first electric actuator 12A detects a first front right wheel acceleration $\alpha FR1$. Also, the acceleration sensor S1 disposed in the second electric actuator 12B detects a first front left wheel acceleration $\alpha FL1$. The acceleration sensor S1 disposed in the third electric actuator 12C detects a first rear right wheel acceleration $\alpha RR1$. The acceleration sensor S1 disposed in the fourth electric actuator 12D detects a first rear left wheel acceleration $\alpha RL1$.

As shown in FIG. 2, the first front right wheel acceleration $\alpha FR1$, the first front left wheel acceleration $\alpha FL1$, the first rear right wheel acceleration $\alpha RR1$ and the first rear left wheel acceleration $\alpha RL1$ are inputted into the control ECU 20. Each of the first front right wheel acceleration $\alpha FR1$, the first front left wheel acceleration $\alpha FL1$, the first rear right wheel acceleration $\alpha RR1$ and the first rear left wheel acceleration $\alpha RL1$ corresponds to an example of the first acceleration $\alpha 1$.

2. Configuration of Electric Suspension Control ECU

The control ECU 20 controls the motor 46 through an inverter 22, based on detection results of the acceleration sensor S1, the stroke sensor S2, the rotation angle sensor S3 and the voltage sensor S4. In the present embodiment, the control ECU 20 controls the motor 46 through the inverter 22 based on the first front right wheel acceleration $\alpha FR1$, the first front left wheel acceleration $\alpha FL1$, the first rear right wheel acceleration $\alpha RR1$, and the first rear left wheel acceleration $\alpha RL1$.

The control ECU 20 includes a memory 21A and a processor 21B.

The memory 21A is a storage device which stores, in a nonvolatile manner, a program to be executed by the processor 21B and data. The memory 21A is composed of a magnetic storage device, a semiconductor storage element such as a flash read only memory (ROM), or another type of nonvolatile storage device. Also, the memory 21A may include a random-access memory (RAM) included in a work area of the processor 21B. The memory 21A stores data to be processed by the control ECU 20, and a control program to be executed by the processor 21B.

The electric suspension control ECU 20 corresponds to an example of "a control device".

The processor 21B may be composed of a single processor, or a plurality of processors which function as the processor 21B. The processor 21B executes the control program to control each part of the electric suspension apparatus 10.

The control ECU 20 includes a correction unit 211, a filter unit 212, and a control execution unit 213. Specifically, the processor 21B of the control ECU 20 executes the control program, to function as the correction unit 211, the filter unit 212, and the control execution unit 213.

The control ECU 20 calculates a first speed V1 from the first acceleration $\alpha 1$ and decreases a control amount to the electric actuator 12, in a case where the first speed V1 is equal to or less than a predetermined speed V1A. Specifically, the control ECU 20 reduces, for example, a component of the first speed V1 with a predetermined frequency FA (e.g., 1 Hz) or less through a high pass filter FLH.

The first speed V1 corresponds to an example of "a speed in an up-down direction".

The control ECU 20 obtains the first speed V1 by integrating a second acceleration α2 obtained by correcting the first acceleration α1. In the present embodiment, the control ECU 20 obtains the first speed V1 by inputting the second acceleration α2 into an integrating filter FLJ.

Further description will be made as to the integrating filter FLJ and the high pass filter FLH with reference to FIG. 3.

Also, the correction unit 211 of the control ECU 20 decreases the control amount to the electric actuator 12, in a case where a direction of the first acceleration α1 of a front wheel and a direction of the first acceleration α1 of a rear wheel are the same direction. In other words, in the case where the direction of the first acceleration α1 of the front wheel and the direction of the first acceleration α1 of the rear wheel are the same direction, the correction unit 211 corrects the first acceleration α1 to decrease the control amount to the electric actuator 12.

Furthermore, the correction unit 211 of the control ECU 20 increases the control amount to the electric actuator 12, in a case where the direction of the first acceleration α1 of the front wheel and the direction of the first acceleration α1 of the rear wheel are opposite directions. In other words, in the case where the direction of the first acceleration α1 of the front wheel and the direction of the first acceleration α1 of the rear wheel are the opposite directions, the correction unit 211 corrects the first acceleration α1 to increase the control amount to the electric actuator 12.

Also, the correction unit 211 of the control ECU 20 corrects the first acceleration α1 of each of the front left and right wheels, by subtracting an average value of first accelerations α1 of the rear left and right wheels from the first acceleration α1 of each of the front left and right wheels. The correction unit 211 of the control ECU 20 corrects the first acceleration α1 of each of the rear left and right wheels, by subtracting an average value of first accelerations α1 of the front left and right wheels from the first acceleration α1 of each of the rear left and right wheels.

Hereinafter, further description will be made as to the processing of the correction unit 211.

The correction unit 211 corrects the first front left wheel acceleration αFL1, the first front right wheel acceleration αFR1, the first rear left wheel acceleration αRL1, and the first rear right wheel acceleration αRR1 by equations (1) to (4) as follows, to obtain a second front left wheel acceleration αFL2, a second front right wheel acceleration αFR2, a second rear left wheel acceleration αRL2, and a second rear right wheel acceleration αRR2.

Note that in the following description, in a case where the first front left wheel acceleration αFL1, the first front right wheel acceleration αFR1, the first rear left wheel acceleration αRL1 and the first rear right wheel acceleration αRR1 are not distinguished from one another, the first acceleration α1 may be described. Also, in a case where the second front left wheel acceleration αFL2, the second front right wheel acceleration αFR2, the second rear left wheel acceleration αRL2 and the second rear right wheel acceleration αRR2 are not distinguished from one another, the second acceleration α2 may be described.

Also, the second front left wheel acceleration αFL2 indicates an acceleration corrected from the first front left wheel acceleration αFL1 by equation (1).

$$\alpha FL2 = \alpha FL1 - K1 \times (\alpha RL1 + \alpha RR1)/2 \qquad (1)$$

The second front right wheel acceleration αFR2 indicates an acceleration corrected from the first front right wheel acceleration αFR1 by equation (2).

$$\alpha FR2 = \alpha FR1 - K1 \times (\alpha RL1 + \alpha RR1)/2 \qquad (2)$$

The second rear left wheel acceleration αRL2 indicates an acceleration corrected from the first rear left wheel acceleration αRL1 by equation (3).

$$\alpha RL2 = \alpha RL1 - K2 \times (\alpha FL1 + \alpha FR1)/2 \qquad (3)$$

The second rear right wheel acceleration αRR2 indicates an acceleration corrected from the first rear right wheel acceleration αRR1 by equation (4).

$$\alpha RR2 = \alpha RR1 - K2 \times (\alpha FL1 + \alpha FR1)/2 \qquad (4)$$

Additionally, each of a first coefficient K1 and a second coefficient K2 is larger than 0 and equal to or less than 1.

Next, description will be made as to effects of the correction by the correction unit 211. First, description will be made as to the case where the direction of the first acceleration α1 of the front wheel and the direction of the first acceleration α1 of the rear wheel are the same direction. For example, description is made as to a case where the first front left wheel acceleration αFL1, the first front right wheel acceleration αFR1, the first rear left wheel acceleration αRL1 and the first rear right wheel acceleration αRR1 satisfy following equation (5).

$$\alpha FL1 = \alpha FR1 = \alpha RL1 = \alpha RR1 \qquad (5)$$

In this case, each of the second front left wheel acceleration αFL2, the second front right wheel acceleration αFR2, the second rear left wheel acceleration αRL2 and the second rear right wheel acceleration αRR2 is represented by following equations (6) and (7).

$$\alpha FL2 = \alpha FR2 = (1 - K1) \times \alpha FL1 \qquad (6)$$

$$\alpha RL2 = \alpha RR2 = (1 - K2) \times \alpha FL1 \qquad (7)$$

Since each of the first coefficient K1 and the second coefficient K2 is larger than 0 and equal to or less than 1, the direction of the second acceleration α2 is the same as that of the first acceleration α1, and an absolute value of the second acceleration α2 is smaller than an absolute value of the first acceleration α1. That is, the control amount to the electric actuator 12 is decreased, by correcting the first acceleration α1 into the second acceleration α2. Therefore, unnecessary power consumption on slopes or the like can be reduced.

Next, description will be made as to a case where the direction of the first acceleration α1 of the front wheel and the direction of the first acceleration α1 of the rear wheel are opposite directions. In this case, an acceleration in a pitch direction acts on the vehicle 1.

For example, description is made as to a case where the first front left wheel acceleration αFL1, the first front right wheel acceleration αFR1, the first rear left wheel acceleration αRL1 and the first rear right wheel acceleration αRR1 satisfy following equation (8).

$$\alpha FL1 = \alpha FR1 = -\alpha RL1 = -\alpha RR1 \qquad (8)$$

In this case, each of the second front left wheel acceleration αFL2, the second front right wheel acceleration αFR2, the second rear left wheel acceleration αRL2 and the second rear right wheel acceleration αRR2 is represented by following equations (9) and (10).

$$\alpha FL2 = -\alpha FR2 = (1 + K1) \times \alpha FL1 \qquad (9)$$

$$\alpha RL2 = -\alpha RR2 = (1 + K2) \times \alpha FL1 \qquad (10)$$

Since each of the first coefficient K1 and the second coefficient K2 is larger than 0 and equal to or less than 1, the direction of the second acceleration α2 is the same as that of the first acceleration α1, and an absolute value of the second acceleration α2 is larger than an absolute value of the first acceleration α1. That is, the control amount to the electric actuator 12 is increased, by correcting the first acceleration α1 into the second acceleration α2. Therefore, the acceleration of the vehicle 1 in the pitch direction can be effectively suppressed.

Next, description will be made as to a case where a direction of the first acceleration α1 of the front or rear left wheel and a direction of the first acceleration α1 of the front or rear right wheel are opposite directions. In this case, an acceleration in a roll direction acts on the vehicle 1.

For example, description is made as to a case where the first front left wheel acceleration αFL1, the first front right wheel acceleration αFR1, the first rear left wheel acceleration αRL1 and the first rear right wheel acceleration αRR1 satisfy following equation (11).

$$\alpha FL1 = \alpha RL1 = -\alpha FR1 = -\alpha RR1 \quad (11)$$

In this case, each of the second front left wheel acceleration αFL2, the second front right wheel acceleration αFR2, the second rear left wheel acceleration αRL2 and the second rear right wheel acceleration αRR2 is represented by following equation (12).

$$\alpha FL2 = \alpha RL2 = -\alpha FR2 = -\alpha RR2 = \alpha FL1 \quad (12)$$

A direction of the second acceleration α2 is the same as that of the first acceleration α1, and an absolute value of the second acceleration α2 is the same as an absolute value of the first acceleration α1. That is, the control amount to the electric actuator 12 is not changed by correcting the first acceleration α1 into the second acceleration α2. Therefore, an effect of suppressing the acceleration in the roll direction does not change.

Figure 3:
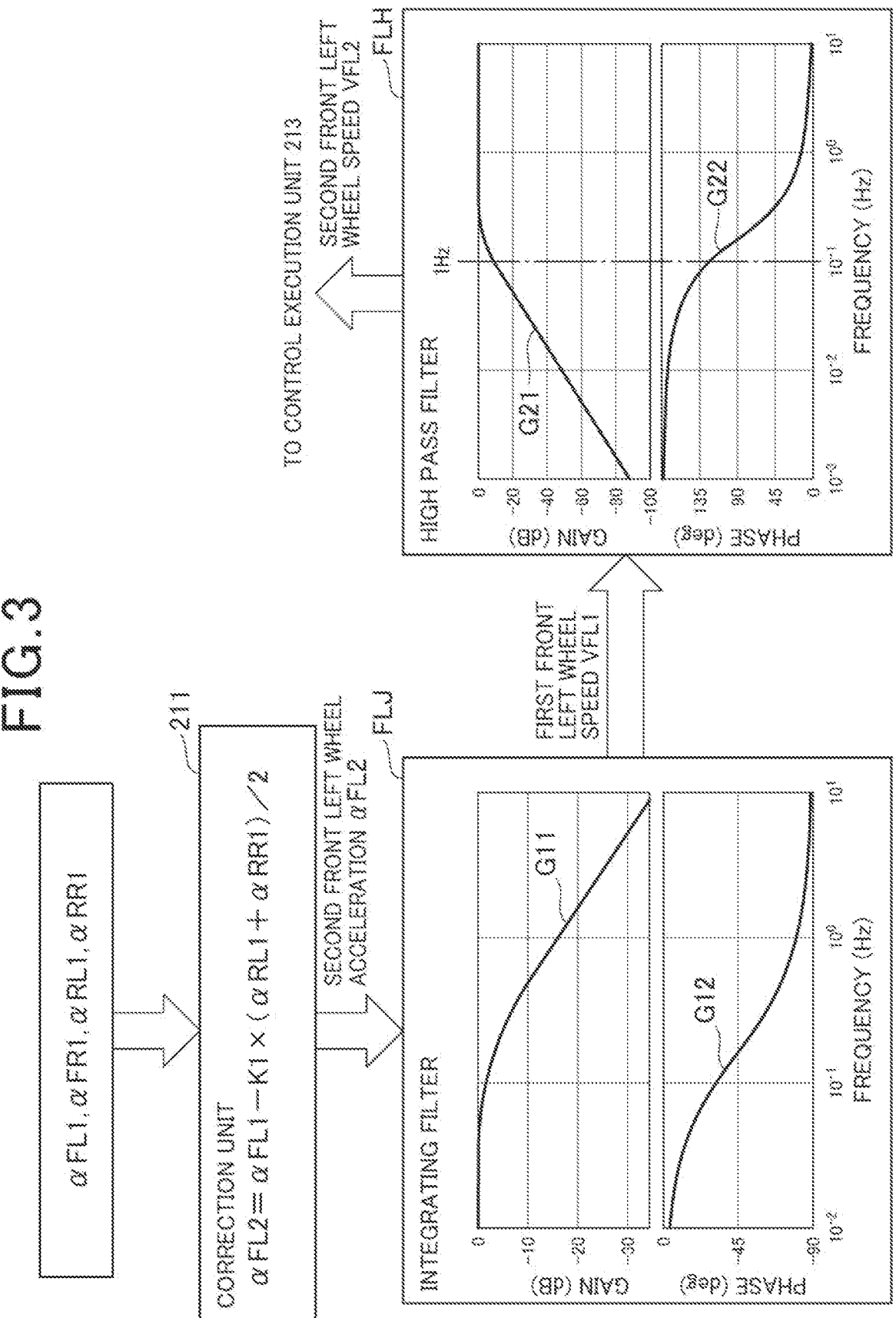
FIG. 3 is a diagram showing an example of processing of an electric suspension control ECU.

FIG. 3 is a diagram showing an example of processing of the electric suspension control ECU 20.

As shown in FIG. 3, the correction unit 211 corrects the first acceleration α1 into the second acceleration α2. With reference to FIG. 3, description is made as to processing to the second front left wheel acceleration αFL2 as an example of the second acceleration α2.

The filter unit 212 integrates the second front left wheel acceleration αFL2, to generate a first front left wheel speed VFL1. The filter unit 212 generates the first front left wheel speed VFL1, for example, by integrating the second front left wheel acceleration αFL2 by use of the integrating filter FLJ.

FIG. 3 shows an example of gain and phase characteristics of the integrating filter FLJ.

A horizontal axis of the gain and phase characteristics indicates a frequency. A vertical axis of the gain characteristics indicates a gain, and a vertical axis of the phase characteristics indicates a phase. A graph G11 shows an example of the gain characteristics of the integrating filter FLJ, and a graph G12 shows an example of the phase characteristics of the integrating filter FLJ.

Similarly, the filter unit 212 integrates the second front right wheel acceleration αFR2 to generate a first front right wheel speed VFR1, integrates the second rear left wheel acceleration αRL2 to generate a first rear left wheel speed VRL1, and integrates the second rear right wheel acceleration αRR2 to generate a first rear right wheel speed VRR1.

In the following description, in a case where the first front left wheel speed VFL1, the first front right wheel speed VFR1, the first rear left wheel speed VRL1 and the first rear right wheel speed VRR1 are not distinguished from one another, the first speed V1 may be described.

Next, the filter unit 212 removes a low frequency component of the first front left wheel speed VFL1 to generate a second front left wheel speed VFL2. The filter unit 212 removes the low frequency component of the first front left wheel speed VFL1 to generate the second front left wheel speed VFL2, for example, by use of the high pass filter FLH.

FIG. 3 shows an example of gain and phase characteristics of the high pass filter FLH.

A horizontal axis of the gain and phase characteristics indicates a frequency. A vertical axis of the gain characteristics indicates a gain, and a vertical axis of the phase characteristics indicates a phase. A graph G21 shows an example of the gain characteristics of the high pass filter FLH, and a graph G22 shows an example of the phase characteristics of the high pass filter FLH.

For example, the high pass filter FLH shown in FIG. 3 removes a low frequency component of the first front left wheel speed VFL1 with 1 Hz or less to generate the second front left wheel speed VFL2.

Similarly, the filter unit 212 removes a low frequency component of the first front right wheel speed VFR1 to generate a second front right wheel speed VFR2, removes a low frequency component of the first rear left wheel speed VRL1 to generate a second rear left wheel speed VRL2, and removes a low frequency component of the first rear right wheel speed VRR1 to generate a second rear right wheel speed VRR2.

In the following description, in a case where the second front left wheel speed VFL2, the second front right wheel speed VFR2, the second rear left wheel speed VRL2 and the second rear right wheel speed VRR2 are not distinguished from one another, a second speed V2 may be described.

A low frequency component of the first speed V1 with 1 Hz or less is removed, to decrease a control amount to the electric actuator 12 corresponding to the low frequency component of the first speed V1 which less influences riding comfort. In other words, in a case where the first speed V1 is equal to or less than the predetermined speed V1A, the control amount to the electric actuator 12 is decreased. Therefore, unnecessary power consumption which less influences the riding comfort can be reduced.

The control execution unit 213 determines the control amount to the electric actuator 12 based on the second speed V2 generated by the filter unit 212. That is, the control execution unit 213 determines the control amount to the first electric actuator 12A based on the second front right wheel speed VFR2. Also, the control execution unit 213 determines the control amount to the second electric actuator 12B based on the second front left wheel speed VFL2. Further, the control execution unit determines the control amount to the third electric actuator 12C based on the second rear right wheel speed VRR2. Additionally, the control execution unit determines the control amount to the fourth electric actuator 12D based on the second rear left wheel speed VRL2.

Specifically, the control execution unit determines a rotation direction and a rotation speed of the screw shaft 42 shown in FIG. 2 by the motor 46 of the electric actuator 12, based on the second speed V2.

3. Configurations and Effects

As described above, an electric suspension apparatus 10 according to the present embodiment includes electric actuators 12 provided for a plurality of wheels TRs, respectively, an acceleration sensor S1 disposed in each of the electric actuators 12, the acceleration sensor detecting a first acceleration α1, and an electric suspension control ECU 20 controlling each of the electric actuators 12 based on the first acceleration α1, and the electric suspension control ECU 20 decreases a control amount to the electric actuator 12, in a case where a first speed V1 based on the first acceleration α1 in the up-down direction is equal to or less than a predetermined speed V1A.

According to this configuration, in the case where the first speed V1 is equal to or less than the predetermined speed V1A, the control unit decreases the control amount to the electric actuator 12. Consequently, unnecessary power consumption which less influences riding comfort can be reduced by appropriately setting the predetermined speed V1A.

Also, the electric suspension control ECU 20 decreases the control amount to the electric actuator 12, in a case where a direction of the first acceleration α1 of a front wheel and a direction of the first acceleration α1 of a rear wheel are the same direction.

According to this configuration, in the case where the direction of the first acceleration α1 of the front wheel and the direction of the first acceleration α1 of the rear wheel are the same direction, the control unit decreases the control amount to the electric actuator 12. Therefore, unnecessary power consumption on slopes or the like can be reduced.

Further, the electric suspension control ECU 20 increases the control amount to the electric actuator 12, in a case where the direction of the first acceleration α1 of the front wheel and the direction of the first acceleration α1 of the rear wheel are opposite directions.

According to this configuration, the control unit increases the control amount to the electric actuator 12, in the case where the direction of the first acceleration α1 of the front wheel and the direction of the first acceleration α1 of the rear wheel are the opposite directions. Therefore, an acceleration of the vehicle 1 in a pitch direction can be effectively suppressed.

Additionally, the electric suspension control ECU 20 corrects the first acceleration α1 of each of the front left and right wheels by subtracting an average value of first accelerations α1 of rear left and right wheels from the first acceleration α1 of each of the front left and right wheels, to calculate a second acceleration α2 of each of the front left and right wheels, corrects the first acceleration α1 of each of the rear left and right wheels by subtracting an average value of first accelerations α1 of the front left and right wheels from the first acceleration α1 of each of the rear left and right wheels, to calculate a second acceleration α2 of each of the rear left and right wheels, and controls the electric actuator 12 based on the second acceleration α2 of each wheel.

According to this configuration, the control unit corrects the first acceleration α1 of each of the front left and right wheels by subtracting the average value of the first accelerations α1 of the rear left and right wheels from the first acceleration α1 of each of the front left and right wheels, to calculate the second acceleration α2 of each of the front left and right wheels. Also, the control unit corrects the first acceleration α1 of each of the rear left and right wheels by subtracting the average value of the first accelerations α1 of the front left and right wheels from the first acceleration α1 of each of the rear left and right wheels, to calculate the second acceleration α2 of each of the rear left and right wheels. Then, the control unit controls the electric actuator 12 based on the second acceleration α2 of each wheel.

Therefore, as described with reference to FIG. 2, the unnecessary power consumption on the slopes or the like can be reduced, and the acceleration of the vehicle 1 in the pitch direction can be effectively suppressed. Note that the above configuration corresponds to a case where each of the first coefficient K1 and the second coefficient K2 in the above equations (1) to (4) is "1".

4. Another Embodiment

Note that the present invention is not limited to the above configuration of the embodiment, and the invention can be implemented in various aspects without departing from the scope of the invention.

For example, the above embodiment describes but is not limited to the case of removing the low frequency component of first speed V1 with 1 Hz or less. In a case where the first speed V1 is equal to or less than the predetermined speed V1A, the control amount to the electric actuator 12 may be decreased. For example, in a case where the first speed V1 is equal to or less than 10 mm/second, the control amount to the electric actuator 12 may be decreased.

For example, the above embodiment describes but is not limited to the case where the electric suspension control ECU 20 integrates the second acceleration α2 by use of the integrating filter FLJ, to generate the speed V1. The electric suspension control ECU 20 may only obtain the speed V1 based on the acceleration α2. For example, the electric suspension control ECU 20 may obtain the speed V1 by integrating the acceleration α2.

Also, the above embodiment describes but is not limited to the case of correcting the first acceleration α1 by equations (1) to (4), to calculate the second acceleration α2. In a case where the direction of the first acceleration α1 of the front wheel and the direction of the first acceleration α1 of the rear wheel are the same direction, the control amount to the electric actuator 12 may be decreased. In the case where the direction of the first acceleration α1 of the front wheel and the direction of the first acceleration α1 of the rear wheel are the same direction, for example, the second acceleration α2 may be calculated in such a manner that a magnitude of second acceleration α2 is smaller than a magnitude of first acceleration α1.

Further, the above embodiment describes but is not limited to the case of correcting the first acceleration α1 by equations (1) to (4), to calculate the second acceleration α2. In a case where the direction of the first acceleration α1 of the front wheel and the direction of the first acceleration α1 of the rear wheel are opposite directions, the control amount to the electric actuator 12 may be increased. In the case where the direction of the first acceleration α1 of the front wheel and the direction of the first acceleration α1 of the rear wheel are the opposite directions, for example, the second acceleration α2 may be calculated in such a manner that the magnitude of second acceleration α2 is larger than the magnitude of first acceleration α1.

At least part of the respective functional blocks shown in FIG. 2 may be achieved in hardware, or in hardware and software, and is not limited to a configuration to arrange independent hardware resources as shown in the drawing.

The control program executed by the processor 21B of the electric suspension control ECU 20 of the electric suspension apparatus 10 is stored in the memory 21A, but the control program may be stored in an external HDD or the like.

A control method of the electric suspension control ECU 20 can be achieved by allowing the processor 21B of the electric suspension control ECU 20 to execute a control program corresponding to the control method of the electric suspension control ECU 20. The control program can be recorded in advance in a computer readable recording medium. As the recording medium, a magnetic or optical recording medium or a semiconductor memory device may be used. Specifically, examples of the recording medium include a portable recording medium such as a flexible disk, a compact disk read only memory (CD-ROM), a digital versatile disc (DVD), Blue-ray (registered trademark) disc, a magneto-optic disk, a flash memory, or a card recording medium, and a fixed recording medium. The recording medium may be a nonvolatile storage device such as RAM, ROM, HDD, or another internal storage device included in the electric suspension apparatus 10. The control method of the electric suspension control ECU 20 may be achieved by storing the control program corresponding to the control method of the electric suspension control ECU 20 in a server device or the like, and by downloading the control program from the server device to the electric suspension control ECU 20.

5. Configurations Supported by the Above Embodiment

The above embodiment supports the following configurations.
(Configuration 1)
An electric suspension apparatus including electric actuators provided for a plurality of wheels, respectively, an acceleration sensor disposed in each of the electric actuators, the acceleration sensor detecting an acceleration in an up-down direction, and a control device controlling each of the electric actuators based on the acceleration in the up-down direction, wherein the control device decreases a control amount to the electric actuator, in a case where a speed in an up-down direction based on the acceleration in the up-down direction is equal to or less than a predetermined speed.

According to the electric suspension apparatus of configuration 1, the speed in the up-down direction is calculated from the acceleration in the up-down direction, and in the case where the speed in the up-down direction is equal to or less than the predetermined speed, the control device decreases the control amount to the electric actuator. Consequently, unnecessary power consumption which less influences riding comfort can be reduced.
(Configuration 2)
The electric suspension apparatus according to configuration 1, wherein the control device decreases the control amount to the electric actuator, in a case where a direction of an acceleration of a front wheel and a direction of an acceleration of a rear wheel are the same direction.

According to the electric suspension apparatus of configuration 2, in the case where the direction of the acceleration of the front wheel and the direction of the acceleration of the rear wheel are the same direction, the control device decreases the control amount to the electric actuator. Therefore, unnecessary power consumption on slopes or the like can be reduced.
(Configuration 3)
The electric suspension apparatus according to configuration 1 or 2, wherein the control device increases the control amount to the electric actuator, in a case where a direction of an acceleration of a front wheel and a direction of an acceleration of a rear wheel are opposite directions.

According to the electric suspension apparatus of configuration 3, in the case where the direction of the acceleration of the front wheel and the direction of the acceleration of the rear wheel are the opposite directions, the control device increases the control amount to the electric actuator. Therefore, an acceleration of a vehicle in a pitch direction can be effectively suppressed.
(Configuration 4)
The electric suspension apparatus according to any one of configurations 1 to 3, wherein the control device corrects the acceleration of each of front left and right wheels, by subtracting an average value of accelerations of rear left and right wheels from the acceleration of each of the front left and right wheels, corrects the acceleration of each of the rear left and right wheels, by subtracting an average value of accelerations of the front left and right wheels from the acceleration of each of the rear left and right wheels, and controls the electric actuator based on a corrected acceleration of each wheel.

According to the electric suspension apparatus of configuration 4, the unnecessary consumption power on the slopes or the like can be reduced, and the acceleration of the vehicle in the pitch direction can be effectively suppressed.

REFERENCE SIGNS LIST

1 vehicle
10 electric suspension apparatus
12 electric actuator
12A first electric actuator
12B second electric actuator
12C third electric actuator
12D fourth electric actuator
13 high voltage line
14 signal line
15 low voltage line
16 battery
20 electric suspension control ECU (control device)
21A memory
21B processor
211 correction unit
212 filter unit
213 control execution unit
22 inverter
26 boosting circuit
28 drive circuit
30 coupling part
32 inner tube
34 nut
40 outer tube
42 screw shaft
44 bearing
46 motor
BD vehicle body
FA predetermined frequency
S1 acceleration sensor
S2 stroke sensor
S3 rotation angle sensor
S4 voltage sensor
ST stroke
TR wheel
V1 first speed (speed in up-down direction)
V1A predetermined speed
VFL1 first front left wheel speed
VFR1 first front right wheel speed
VRL1 first rear left wheel speed
VRR1 first rear right wheel speed
V2 second speed
VFL2 second front left wheel speed VFR2 second front right wheel speed
VRL2 second rear left wheel speed
VRR2 second rear right wheel speed
VH high voltage
α1 first acceleration (acceleration in up-down direction)
αFL1 first front left wheel acceleration
αFR1 first front right wheel acceleration
αRL1 first rear left wheel acceleration
αRR1 first rear right wheel acceleration
α2 second acceleration
αFL2 second front left wheel acceleration
αFR2 second front right wheel acceleration
αRL2 second rear left wheel acceleration
αRR2 second rear right wheel acceleration
θ rotation angle

What is claimed is:

1. An electric suspension apparatus comprising:
   electric actuators provided for a plurality of wheels, respectively,
   an acceleration sensor disposed in each of the electric actuators, the acceleration sensor detecting an acceleration of the wheel in an up-down direction, and
   a processor controlling each of the electric actuators based on the acceleration of the wheel in the up-down direction, wherein the processor decreases a control amount to the electric actuator, in a case where a speed of the wheel in an up-down direction based on the acceleration of the wheel in the up-down direction is equal to or less than a predetermined speed.

2. The electric suspension apparatus according to claim 1, wherein the processor decreases the control amount to the electric actuator, in a case where a direction of an acceleration of a front wheel and a direction of an acceleration of a rear wheel are the same direction.

3. The electric suspension apparatus according to claim 1, wherein the processor increases the control amount to the electric actuator, in a case where a direction of an acceleration of a front wheel and a direction of an acceleration of a rear wheel are opposite directions.

4. The electric suspension apparatus according to claim 1, wherein the processor
   corrects the acceleration of each of front left and right wheels, by subtracting an average value of the accelerations of rear left and right wheels from the acceleration of each of the front left and right wheels,
   corrects the acceleration of each of the rear left and right wheels, by subtracting an average value of the accelerations of the front left and right wheels from the acceleration of each of the rear left and right wheels, and
   controls the electric actuator based on a corrected acceleration of each wheel.

* * * * *